United States Patent [19]

Kapany et al.

[11] 4,329,017
[45] May 11, 1982

[54] FIBER OPTICS COMMUNICATIONS MODULES

[75] Inventors: Narinder S. Kapany, Woodside; Fred C. Unterleitner, Palo Alto, both of Calif.

[73] Assignee: Kaptron, Inc., Palo Alto, Calif.

[21] Appl. No.: 66,367

[22] Filed: Aug. 14, 1979

[51] Int. Cl.³ .............................................. G02B 7/26
[52] U.S. Cl. ..................................... 350/96.15; 250/227; 350/96.18; 350/96.19; 350/96.20
[58] Field of Search ............... 350/96.15, 96.16, 96.17, 350/96.18, 96.19, 96.20, 96.21, 172, 173, 174, 293, 296, 162 R; 370/1, 3; 250/227

[56] References Cited

U.S. PATENT DOCUMENTS

| | | | |
|---|---|---|---|
| 3,244,075 | 4/1966 | Richards et al. | 350/96.15 |
| 3,883,223 | 5/1975 | Hudson | 350/96.16 |
| 3,886,544 | 5/1975 | Narodny | 340/365 P |
| 3,973,850 | 8/1976 | Pouey | 350/162 R X |
| 4,013,342 | 3/1977 | Narodny | 350/96.20 |
| 4,079,382 | 3/1978 | Henry | 350/162 R X |
| 4,094,578 | 6/1978 | Di Vita et al. | 350/96.15 |
| 4,102,579 | 7/1978 | Stewart | 356/201 |
| 4,111,524 | 9/1978 | Tomlinson | 350/96.19 |
| 4,143,941 | 3/1979 | Soref | 350/96.16 |
| 4,153,330 | 5/1979 | Tomlinson | 350/96.17 |
| 4,156,556 | 5/1979 | Klein et al. | 350/96.15 |
| 4,182,544 | 1/1980 | McMahon | 350/96.16 |
| 4,198,117 | 4/1980 | Kobayashi | 350/96.19 |
| 4,280,751 | 7/1981 | Di Vita | 350/96.15 |

FOREIGN PATENT DOCUMENTS

| | | | |
|---|---|---|---|
| 2415046 | 10/1975 | Fed. Rep. of Germany | 350/96.18 |
| 2655114 | 6/1977 | Fed. Rep. of Germany | 350/96.16 |
| 2703887 | 8/1977 | Fed. Rep. of Germany | 350/96.16 |
| 2299657 | 8/1976 | France | 350/96.18 |
| 1017354 | 1/1966 | United Kingdom | 350/96.18 |
| 1542194 | 3/1979 | United Kingdom | 350/96.18 |

OTHER PUBLICATIONS

Bressani et al, "Pivoting Light Guides", *Nuclear Instruments & Methods,* vol. 136, No. 2, Jul. 1976, pp. 401–402.
Kompfner et al, "Holographic Couplers For . . .", SRC Contract B/RG/64915, 1975 Progress Report (Part 3), Oxford Univ., Eng., Jan. 1977, pp. 79–130.
Reinhart, "Light Switch For Fiber Optics", *IBM Tech. Discl. Bull.,* vol. 19, No. 12, May 1977, pp. 4681–4682.
Lean, "Taps For Multimode Fibers", *IBM Tech. Discl. Bull.,* vol. 21, No. 4, Sep. 1978, p. 1685.

*Primary Examiner*—John D. Lee
*Attorney, Agent, or Firm*—Townsend and Townsend

[57] ABSTRACT

The present invention provides modules for interfacing optical fibers with very low light loss and with provision for monitoring of the optical signal. The modules according to the present invention are characterized by the precise tolerances required in high capacity optical communication systems and yet may be mass produced at reasonable costs. A device according to the present invention comprises a transparent imaging element having a curved reflective surface at one end and prealigned fiber insertion holes at the other end. The transparent element is characterized by an index of refraction equal to that of the fiber core, and the fibers are glued in their respective holes with index matching cement.

20 Claims, 15 Drawing Figures

FIBER OPTICS COMMUNICATIONS MODULES

FIELD OF THE INVENTION

This invention relates generally to optical fiber communications, and more specifically to modules for intercoupling of light from or to fibers and performing monitoring, splitting, switching, duplexing and multiplexing functions.

BACKGROUND OF THE INVENTION

As existing communication systems have become increasingly overloaded, optical transmission through transparent fibers has been found to provide a means of achieving a smaller cross-section per message, thus enabling an increased capacity within existing conduit constraints. The basic medium of transmission is an optical fiber. A first type of fiber is a stepped index fiber which comprises a transparent core member and a transparent cladding, the core member having a higher index of refraction than the cladding. Light is transmitted through the core, and contained within the core by internal reflection. So long as the light does not deviate from the fiber axis by more than the complement of the critical angle for the core-cladding interface, total internal reflection with substantially no loss results. A second type of fiber is a graded index fiber whose refractive index gradually decreases away from the fiber axis. Transmission is highly reliable, and is substantially insensitive to electrical noise, cross coupling between channels, and the like.

As with any communication medium, once a suitable transmission line has been found, the need arises for modules to couple sources and detectors to the line, couple lines together, perform switching, splitting, duplexing, and multiplexing functions. Ultimately, the total system can be no more reliable than these modules. When it is considered that the core of a typical optical communication fiber is characterized by a diameter of only 60 microns, it can be immediately appreciated that such modules must be fabricated and installed to highly precise tolerances.

In order to realize the inherent reliability of optical fiber communication systems, the modules themselves must be highly reliable since they are typically installed in relatively inaccessible locations (e.g. within conduits running under city streets, etc.). Given this requirement, it can be seen that it would be highly desirable to have monitoring signals that would verify the operation of the modules and the integrity of the fibers themselves. A further requirement for a satisfactory optical communication system is that the modules introduce a minimum of loss into the system. It has only been with the development of extremely high transparency fibers that optical fiber communication has become practical, and the introduction of lossy modules would considerably undercut the advantages and efficacy of such systems.

Unfortunately, existing devices for interfacing fibers to sources, detectors, and each other, have proved to be lossy, bulky, delicate, and expensive. Thus, while fiber optic communication systems are providing to be highly advantageous they are prevented from realizing their fullest potential.

SUMMARY OF THE INVENTION

The present invention provides modules for interfacing optical fibers with very low light loss and with provision for monitoring of the optical signal. The modules according to the present invention are characterized by the precise tolerances required in high capacity optical communication systems and yet may be mass produced at reasonable costs.

A device according to the present invention comprises a transparent imaging element having a curved reflective surface at one end and prealigned fiber insertion holes at the other end. The transparent element is characterized by an index of refraction equal to that of the fiber core, and the fibers are glued in their respective holes with index matching cement. The holes facilitate precision alignment and provide mechanical strength. The curved reflective surface is characterized by a focal plane having the property that a point source of light at a first location in the focal plane is imaged at a second complementary location in the focal plane, and the fiber insertion holes maintain the ends of the fibers at suitable complementary locations within the focal plane. In this context, the term "fiber insertion hole" should also be taken to include a hole sized to maintain a light source or detector at a given location within the focal plane. In some applications, the source or detector would be directly mounted to the transparent imaging element, while in other applications the source or detector would communicate with the imaging element via a short length of fiber.

The use of a transparent imaging element characterized by an index of refraction equal to that of the fiber core has the important advantage that fresnel reflection at the fiber end, a significant potential source of loss of the signal, is eliminated. Also, refraction which would spread the light, thus necessitating a larger reflective surface, is avoided. Moreover, the use of prealigned fiber insertion holes wherein the fiber ends are cemented into automatic registered position with index matching cement results in a monolithic structure that is dimensionally stable and sufficiently rugged to provide many years of trouble free operation. A further advantage of the monolithic structure wherein reflective light losses are avoided is that reflected light pulses that could affect other communication lines within the system are avoided.

According to one aspect of the present invention, the reflective surface is chosen to transmit a selected fraction of the light falling on the surface so that the signal being coupled through the device may be monitored. Typically, a small fraction (e.g. 1%) of the light is transmitted for this purpose. The signal extracted for monitoring purposes is insensitive to mode structure within the fibers. In view of the minimal losses due to the monolithic structure, this monitoring fraction does not significantly degrade the overall system efficiency. The reflective surface is preferably a multilayer dielectric coating on the polished curved surface of the transparent imaging element. Depending on system requirements, the fraction of the signal extracted for monitoring purposes may be selected over a wide range by adjusting the characteristics of the multilayer dielectric coating.

According to a further aspect of the present invention, the reflecting surface is a spherical surface with the focal plane passing through the center of curvature and perpendicular to a radial axis with complementary points being located a short distance on opposite sides of the center of curvature in the focal plane. The fiber insertion holes for fibers to be coupled are preferably inclined with respect to one another so that their axes, when extended, intersect the reflective surface at a common point of intersection. This has the desirable effect of preserving modes or angles (e.g. the axial ray from one fiber is incident to the second fiber along that fiber's axis). The spherical surface, in addition to preserving angles, is characterized by a minimum of aberration.

A coupler according to the present invention provides paired fiber insertion holes on opposite sides of the axis and having bottoms lying in the focal plane. The light emerging from the core of one fiber is imaged by the reflecting surface onto the core of the other fiber. A light source such as an LED may be provided at one of the fiber insertion holes, in order to make a source/fiber coupler. Typically, the source requires a larger diameter hole than if a fiber alone were being inserted, but is conceptually and functionally no different from a fiber. The coupler (which may be a fiber/fiber coupler or a source/fiber coupler) is preferably provided with a reflective surface having enough transmissivity to provide a monitoring signal (as described above).

A splitter according to the present invention divides light carried by an input fiber evenly among a plurality of output fibers. Assuming that there are N such output fibers, the reflective surface is configured to have N pie-shaped spherical surface segments having wedge angles 360°/N and sphere centers between the center of the input fiber and the center of a respective output fiber. A plane relecting surface may be interposed between each output fiber and a pie-shaped segment of the light cone from the input fiber, in which case the spherical surface segments do not abut one another. The division of energy in such an N-way splitter is insensitive to azimuthal mode structure.

A single-pole/N-throw switch according to the present invention has an input fiber, a plurality of output fibers, and a single continuous smooth imaging surface. In order to selectively communicate optical information between the input fiber and one of the output fibers, the switch is provided with pivot means for allowing rotation of the reflective surface about a point between the focal plane and the reflective surface so that the optic axis may be caused to intersect the focal plane at varying positions depending on the rotation, and indexing means for maintaining the reflecting surface in a selected one of a plurality of positions wherein the optic axis intersects the focal plane substantially midway between the input fiber end and the corresponding output fiber end. Electromagnet coils may be used to selectively cause the pivoting. The transparent element may be fabricated from flexible material and provided with a necked portion for flexing, or may be rigid and articulated, having, for example, an optical ball bearing interface.

Duplexing, multiplexing, and demultiplexing are carried out according to the present invention by having multiple optical signals of differing wavelengths transmitted simultaneously on a single optical fiber. A device that will perform duplexing, multiplexing and demultiplexing comprises classifying means co-operating with the imaging reflective surface so that light of a first wavelength emanating from the fiber end is imaged at a first location and light of a second wavelength emanating from the fiber end is imaged at a second location displaced from the first position. If a light source of the first wavelength is positioned at the first image location and a detector sensitive to light of the second wavelength is positioned at the second image location, the device functions as a duplexer, a corresponding device with source and detector reversed at the other end providing a duplexed system. If sources of light at the first and second wavelengths are placed at the respective image locations, the device functions as a multiplexer. If detectors sensitive to light of the first and second wavelength are positioned at the first and second image locations, the device functions as a demultiplexer. The classifying means may be dichroic beam splitter surfaces so that light of a particular wavelength is reflected from the path and sent to a separate imaging surface. Alternately, the imaging surface and the classifying means may be together defined by a concave reflection grating.

For a further understanding of the nature and advantages of the present invention, reference should be had to the remaining portions of this specification and to the attached drawings.

DESCRIPTION OF THE PREFERRED EMBODIMENTS

The present invention relates to modules for interfacing optical fibers with each other, with light sources, and with detectors. This is generally accomplished by positioning detectors, sources, or respective ends of such fibers in a focal plane as will be described below. It will be immediately apparent to one of ordinary skill in the art that an input fiber and a light source may be substituted for one another, that an output fiber and a detector may be substituted for one another, and that the system may be "time reversed" by interchanging inputs and outputs. Therefore, while the description that follows is in specific terms, such equivalent systems will be made readily apparent.

Figure 1:
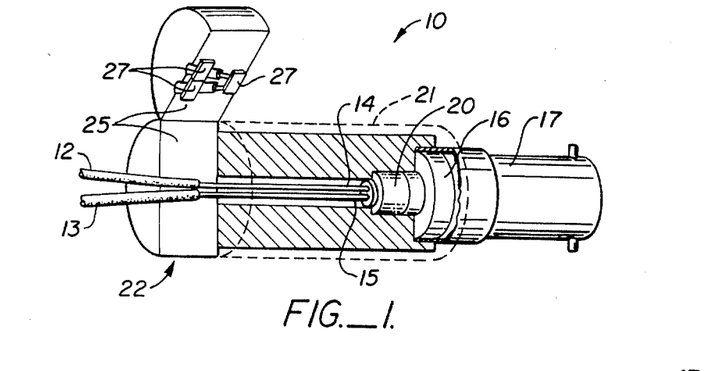
FIG. 1 is an isometric cut-away view of a fiber/fiber coupler according to the present invention.

FIG. 1 is an isometric cut-away view of a fiber/fiber coupler 10 according to the present invention. Coupler 10 couples input and output fiber optic cables 12 and 13 having respective fibers 14 and 15 therein so that optical information traveling within the core of input fiber 14 is transmitted to the core of output fiber 15 with low loss. An electrical output signal proportional to the optical signal power in fiber 14 is provided by monitor unit 16 at an electrical output terminal 17 (preferably a "BNC" output connector). Fibers 14 and 15 optically communicate with a transparent imaging element 20 within a housing 21 as will be described below, the optical communication requiring precise registration of the ends of the fibers. Gross mechanical positioning of the fiber optic cables is accomplished by a clamping mechanism 22 comprising grooved mating body portions 25 for positioning and holding the cables. Elastomeric compression seals 27 provide strain relief when mating portions 25 are tightly fastened to one another, as for example by screwing.

Figure 2:
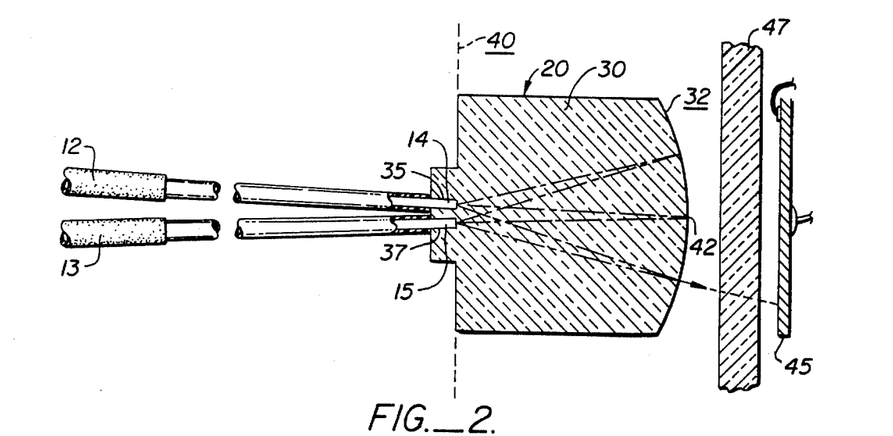
FIG. 2 is a simplified cross-sectional view of the coupler of FIG. 1.

FIG. 2 is a cross-sectional view of transparent imaging element 20 with fibers 14 and 15 registered thereto. Imaging element 20 comprises a body 30 of transparent material, body 30 having a curved surface 32 at a first end and paired cylindrical fiber insertion holes 35 and 37 at a second end. Surface 32 is a polished surface and coated with a reflective coating such as a multilayer dielectric coating that reflects most of the light incident on it from within transparent body 30, but transmits a small fraction. Surface 32 is characterized by a focal plane 40 having the property that a point source in focal plane 40 is imaged in focal plane 40. Surface 32 is preferably spherical, in which case focal plane 40 is perpendicular to a radial axis and passes through the center of curvature. Fiber insertion holes 35 and 37 are of a diameter to accomodate fibers 14 and 15 and to maintain the fiber ends at precisely registered locations in focal plane 40 such that the cone of light emanating from the end of fiber 14 is imaged on the end of fiber 15. Body 30 is preferably formed from a transparent plastic by an injection molding process. The transparent material is chosen to have an index of refraction equal to that of the fiber core, and the fiber ends are glued into their respective fiber insertion holes with an index matching cement. The fiber insertion holes themselves do not provide the precision alignment, but rather facilitate such alignment which may be carried out in a suitable jig or the like. Once the fibers have been cemented into the holes, mechanical strength is achieved.

Monitor unit 16 comprises a photodetector 45 and an associated protective window 47. Monitor unit 16 is located outside transparent body 30 in a position to intercept the light that is transmitted by the reflective coating on surface 32. Monitor unit 16 is a self contained unit which may be inserted into housing 21 if the monitoring function is required. If no monitoring is required, an opague plug may close off the end of housing 21.

The ends of fibers 14 and 15 are cleaved perpendicular to the respective axes and located symetrically about the center of curvature within focal plane 40. In order to preserve modes, fiber insertion holes 35 and 37 are inclined with respect to one another so that the axes of the respective fibers are directed to a common intersection point 42 on the axis of surface 32.

Figure 3:
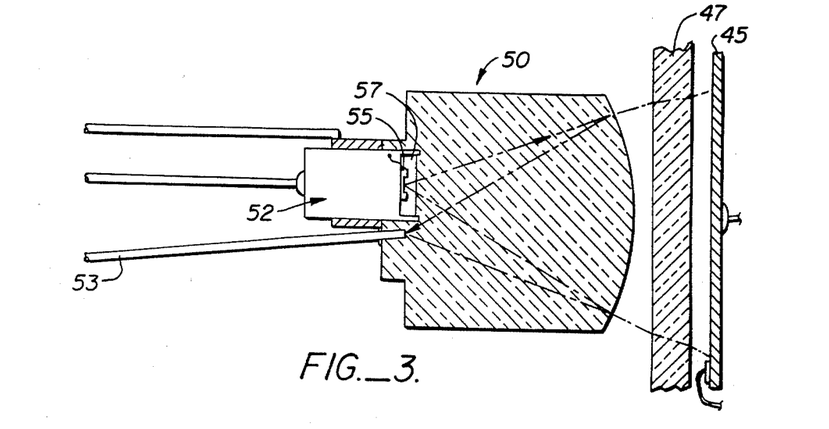
FIG. 3 is a simplified cross-sectional view of a source/fiber coupler.

As discussed above, a light source may be substituted for input fiber 14 without any change in the functioning of the device. FIG. 3 shows a source/fiber coupler 50 that differs from fiber/fiber coupler 10 only in that a light source 52 is substituted for input fiber 12. The purpose of coupler 50 is to transmit the light from source 52 into a fiber 53. Source 52 may be a metal/ceramic "pillbox" light emitting diode or a laser having an optical coupling plastic window 55 and an oil interface 57 to provide optical continuity and index matching. Since light source 52 has a larger diameter than that of a fiber, the complementary optical points within the focal plane are moved farther away from the center of curvature to accomodate the larger diameter element. In order to maintain mode preservation and minimize aberrations, fiber 53 is inclined at a corresponding larger angle with respect to the optic axis. Where a monitoring function is carried out, the current from photodetector 45 may be used to provide feedback to the power source driving light source 52 to improve the linearity of the dependence of light output on drive current.

Figure 4A:
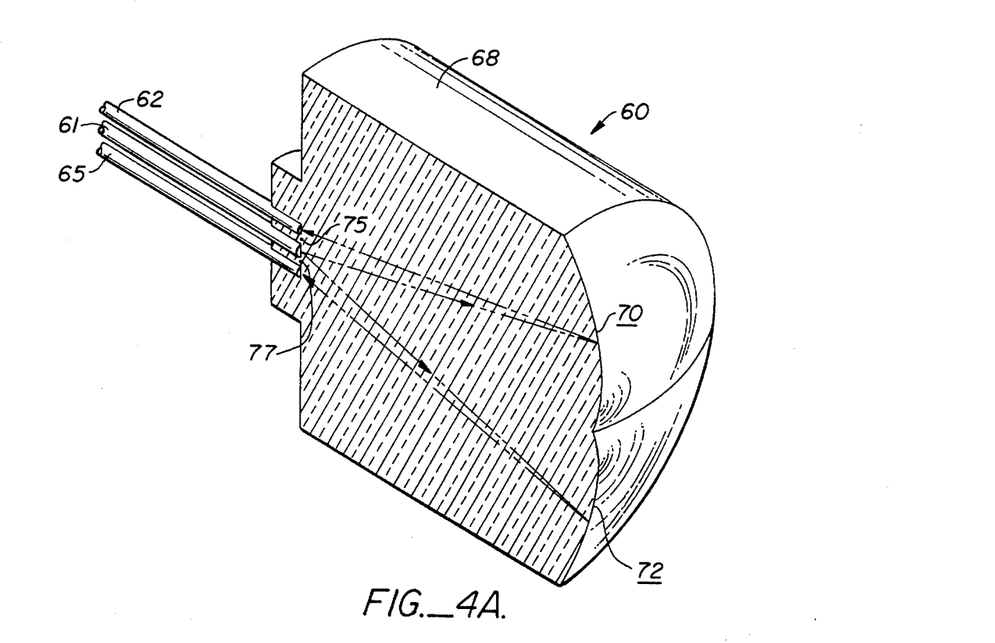
FIGS. 4A and 4B are simplified cross-sectional views of different embodiments of a splitter according to the present invention.

FIG. 4A shows a first embodiment of a two-way splitter 60 for dividing the light carried by an input fiber 61 between first and second output fibers 62 and 65. As in the coupler, the basic element of splitter 60 is a transparent body 68 having a reflective surface at one end and fiber insertion holes at the other end. However, the reflective surface is continuous but not mathematically smooth, comprising abutting spherical surface segments 70 and 72. Spherical surface segments 70 and 72 are characterized by the same radius but have respective centers of curvature 75 and 77 that are displaced from the axis of input fiber 61. In particular, center of curvature 75 is midway between the end of fiber 61 and the end of fiber 62; center of curvature 77 is midway between the end of fiber 61 and fiber 65. Generally, for an N way splitter, N pie-shaped surface segments having wedge angles 360°/N and respective sphere centers in a circular array surrounding the end of the input fiber would be required.

Figure 4B:
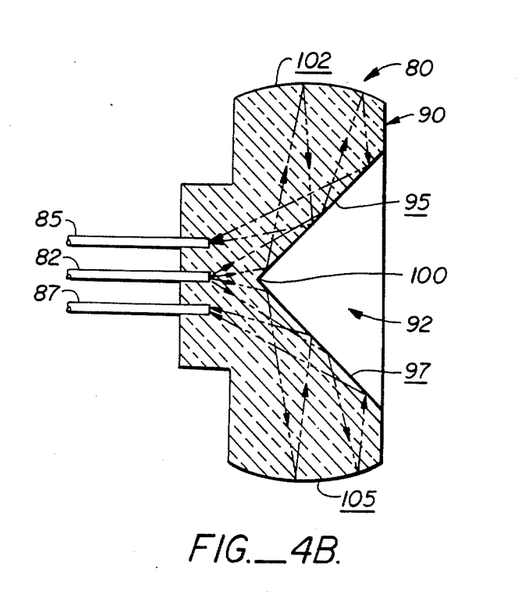

FIG. 4B is a cross-sectional view of an alternate embodiment of a two-way splitter 80 for dividing the light from an input fiber 82 evenly between output fibers 85 and 87. This embodiment differs from the embodiment of FIG. 4A in that each fraction of the input light cone is intercepted by a plane reflecting surface before encountering the corresponding focusing segment. In particular, a transparent body 90 is configured with a wedge-shaped depression 92 which defines respective plane interfaces 95 and 97 that come together at an apex 100 on the axis of input fiber 82. The half cone that reflects from plane surface 95 impinges on a first curved reflective segment 102 and is focused on the end of output fiber 85. Similarly the other half cone is incident on a second curved reflective segment 105 and focused on output fiber 87. This embodiment is typically easier to fabricate than the embodiment of FIG. 4A since all the curved segments, if spherical, may be located with a common center of curvature. The differing points of focus are achieved by providing a wedge angle of slightly more than 90°. Generally, for an N-way splitter with N>2, an N-sided pyramid rather than a wedge is used.

Figure 5A:
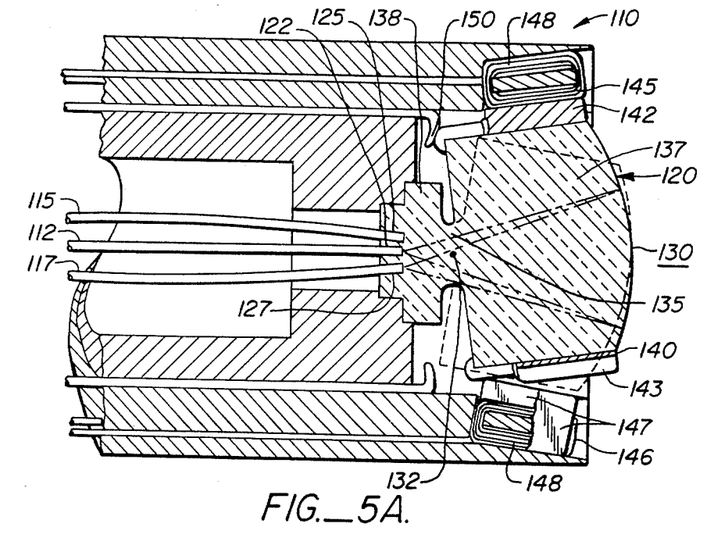
FIGS. 5A and 5B are simplified cross-sectional views of alternate embodiments of a switch according to the present invention.

FIG. 5A is a cross-sectional view of a two-way (single-pole/double-throw) switch 110 for selectively directing light traveling along an input fiber 112 to either of paired output fibers 115 and 117. Switch 110 comprises a transparent body 120 having respective fiber insertion holes 122, 125, and 127 at one end, and a continuous, mathematically smooth focusing surface 130 at the other end. Selective switching is accomplished by providing pivoting means to permit reflective surface 130 to rotate relative to the fiber insertion holes about a point 132 intermediate the fiber ends and the reflective surface and located along the axis of input fiber 112. This is accomplished by fabricating body 120 out of a flexible transparent material and providing the body with a necked portion 135 proximate pivot point 132 of relatively small diameter to permit flexing without deformation of the remaining portions of body 120. In particular, when body 120 is flexed about pivot point 132, a body portion 137 moves relative to a body portion 138 to permit the center of curvature of spherical surface of segment 130 to be selectively directed to a point midway between the ends of fibers 112 and 115 or between the ends of fibers 112 and 117.

The rotation is effected by electromagnetic deflection. A soft steel sleeve 140 surrounds body portion 137 having reflective surface 130 thereon and carries tapered wedge sections 142 and 143. For an N-way switch, there are N such wedge sections. Corresponding electromagnets 145 and 146 are mounted to the fixed housing corresponding to each switch position. Each electromagnet includes a yoke 147 and a coil 148. The yoke has portions defining a tapered depression with surfaces adapted to mate with the outer surfaces of its respective wedge section on sleeve 140 in order to index movable body portion 137 to the desired position. Magnetic latch elements 150 may be provided to maintain a given switch position after the respective electromagnet current has been turned off.

Figure 5B:
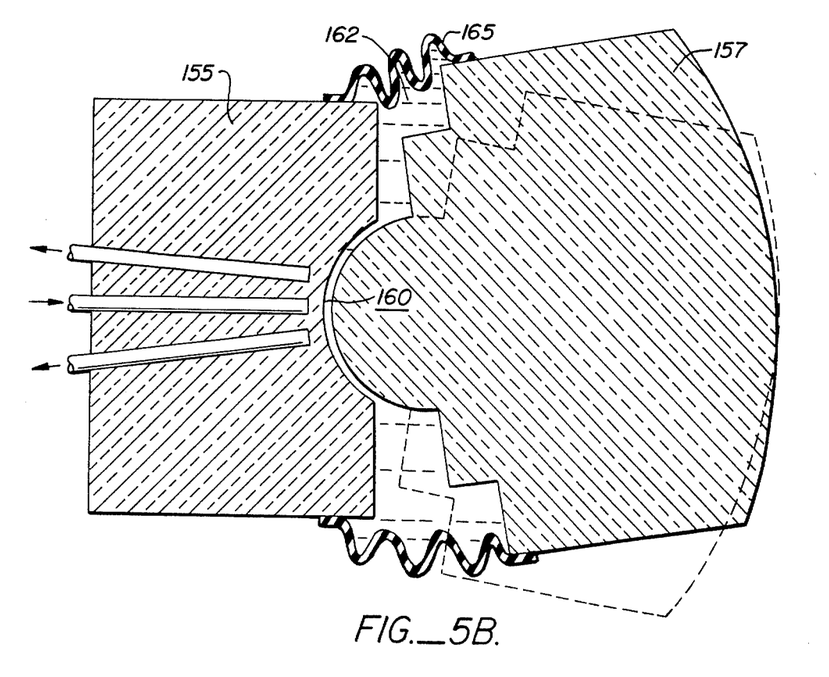

FIG. 5B is a simplified cross-sectional view showing an alternate embodiment of a two-way switch. This embodiment differs from that of FIG. 5B in that the body comprises two relatively movable portions 155 and 157 having a spherical interface 160 therebetween to define an optical ball bearing. The variable region between body portions 155 and 157 is filled with a silicone oil reservoir 162 being bounded by a suitable bellows 165. The two mating parts are maintained in tension against one another by a magnet or spring (not shown). While FIGS. 5A and 5B illustrate two-way switches, it will be immediately appreciated that an N-way switch is achieved by the provision of additional input fiber insertion holes, additional indexing electromagnets, and corresponding tapered wedge sections on the sleeve.

Figure 6:
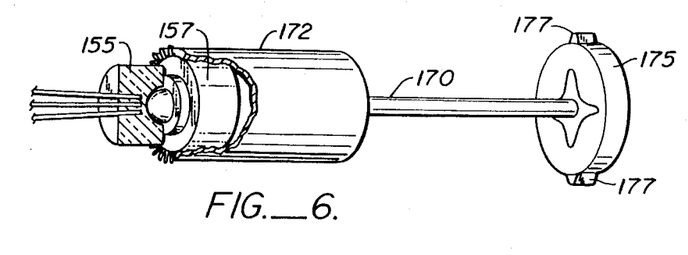
FIG. 6 is an exploded view of the switch of FIG. 5B showing a mechanism for achieving increased precision.

FIG. 6 illustrates an additional embodiment of an indexing system suitable for either of the two switch embodiments described above, but illustrated for the embodiment of FIG. 5B for definiteness. It will be immediately apparent that the angular positioning of movable body portion 157 with respect to fixed body portion 155 having fiber insertion holes therein is extremely critical to proper operation of the switch. In particular, this translates into precise tolerances on the fabrication of the sleeve surrounding the movable body portion and the location of the electromagnets. It has been found that increased precision of angular orientation can be achieved by separating the wedges and electromagnets from the movable body portion along the axial direction. In particular, an axial lever arm 170 rigidly couples a sleeve 172 surrounding movable body 157 with a soft steel ring 175 having tapered wedged portion 177 mounted thereon in the same fashion that tapered wedged portion 142 and 143 were mounted to sleeve 140 in FIG. 5A. Sleeve 172, lever arm 170 and ring 175 are coaxially aligned. Electromagnets, not shown, cooperate with wedges 177 in precisely the same manner that electromagnets 145 and 146 cooperated with wedges 142 and 143 in FIG. 5A.

Figure 7A:
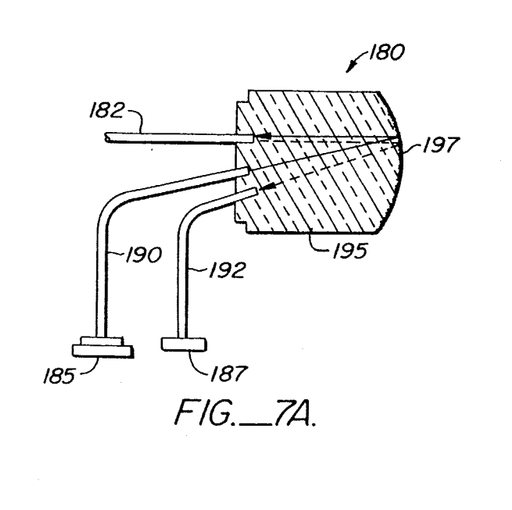
FIGS. 7A and 7B are simplified cross-sectional views of alternate embodiments of two colored duplexers.

FIG. 7A is a simplified cross-sectional view of a duplexer 180 according to the present invention. The purpose of duplexer 180 is to permit optical information to be transmitted simultaneously in both directions on a single fiber 182. This is accomplished by using optical signals of differing wavelengths for the different directional transmission, and incorporating classification means to separate the optical signals. In particular, duplexer 180 couples a source 185 of light of a first wavelength and a detector 187 sensitive to light of a second different wavelength to fiber 182. While source 185 and detector 187 are shown communicating to duplexer 180 by short fibers 190 and 192, such sources and/or detectors could be directly mounted to the duplexer. Duplexer 180 itself comprises a transparent body 195 having a curved surface at one end and fiber insertion holes at the other end. However, in contrast with the devices described above, the curved surface carries a concave reflection grating 197. Grating 197 has the property that light emanating from a point in a curved focal surface is imaged at different locations in the focal surface depending on the wavelength of the light. Different image points are determined by the spacing of the grating lines and the particular wavelengths involved. Thus, fiber 190 has its end at the complementary position with respect to the end of fiber 182 for the first wavelength and fiber 192 has its end at a complementary position with respect to the end of fiber 182 for the second wavelength. Thus, light from source 185 is imaged onto the end of fiber 182 and transmitted away from duplexer 180 while light of the second wavelength traveling along fiber 182 in a direction toward duplexer 180 is imaged onto the end of fiber 192 and thus transmitted to detector 187.

Figure 7B:
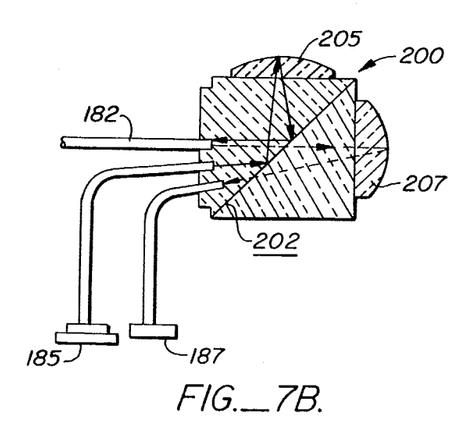

FIG. 7B illustrates an alternate embodiment of a duplexer 200 wherein the classification means and the imaging means are separated. In particular, a dichroic beam splitter interface 202 is reflective with respect to light of the first wavelength and transmissive with respect to light of the second wavelength. Beam splitter interface 202 is disposed at approximately 45° from the axis of fiber 182 so that light of the first wavelength is significantly deviated from its original path. Separate reflective imaging elements 205 and 207 cooperate with beam splitter surface 202 in order to couple light of the first wavelength between source 185 and fiber 182 and light of the second wavelength between fiber 182 and detector 187. In a duplex system, a similar duplexer would be employed at at remote end of fiber 182, except that source 185 and detector 187 would be replaced by a detector sensitive to light of the first wavelength and a source of light of the second wavelength, respectively.

Figure 8A:
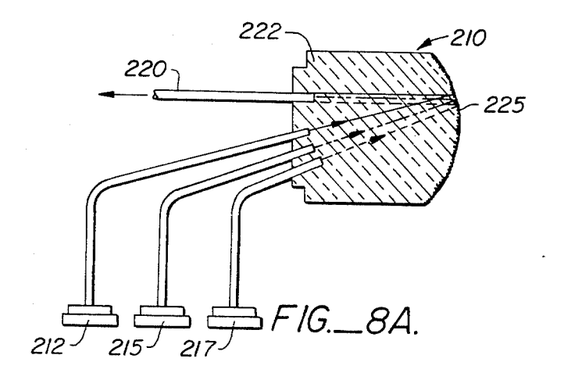
FIGS. 8A, 8B and 8C are simplified cross-sectional views of multiplexer and demultiplexer embodiments.

FIG. 8A shows a first embodiment of a threecolor multiplexer for simultaneously transmitting optical information from three sources 212, 215, and 217 along a single fiber 220. Multiplexer 210 comprises a transparent body 222 having a concave reflection grating 225 as described in connection with duplexer 180. In fact, duplexer 180 could be converted to a two color multiplexer by substituting a source of light of the second wavelength for detector 187.

Figure 8B:
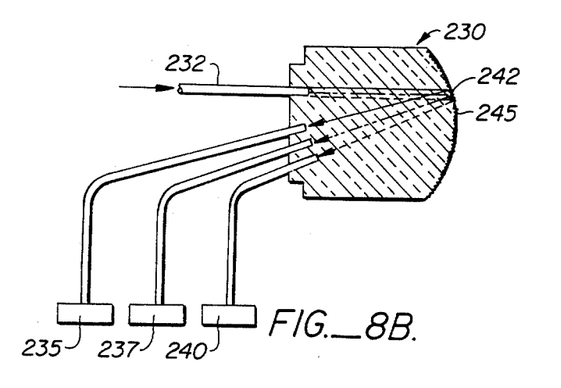

FIG. 8B shows a three color demultiplexer 230 for receiving simultaneous transmission of light at three wavelengths along a fiber 232 and sending the light to three detectors 235, 237 and 240. Since the light from the different wavelengths is spatially separated, detectors 235, 237 and 240 could be detectors that are sensitive to all three wavelengths, although selective wavelength detectors may be preferable. Demultiplexer 230 is substantially identical to multiplexer 210 and comprises a transparent body 242 having a concave reflection grating 245 at one end and fiber insertion holes at the other.

Figure 8C:
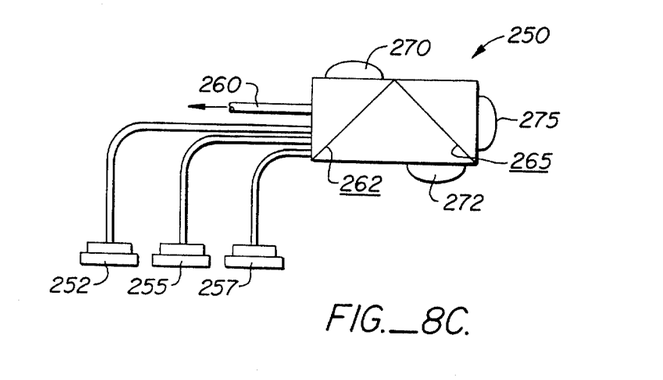

FIG. 8C shows an alternate embodiment of a three color multiplexer 250 for transmitting light at three wavelengths from respective sources 252, 255 and 257 along a single fiber 260. This is accomplished by two dichroic beam splitter surfaces 262 and 265 and separate reflective imaging elements 270, 272, and 275. This embodiment functions substantially the same as duplexer 200 shown in FIG. 7B.

Figure 9A:
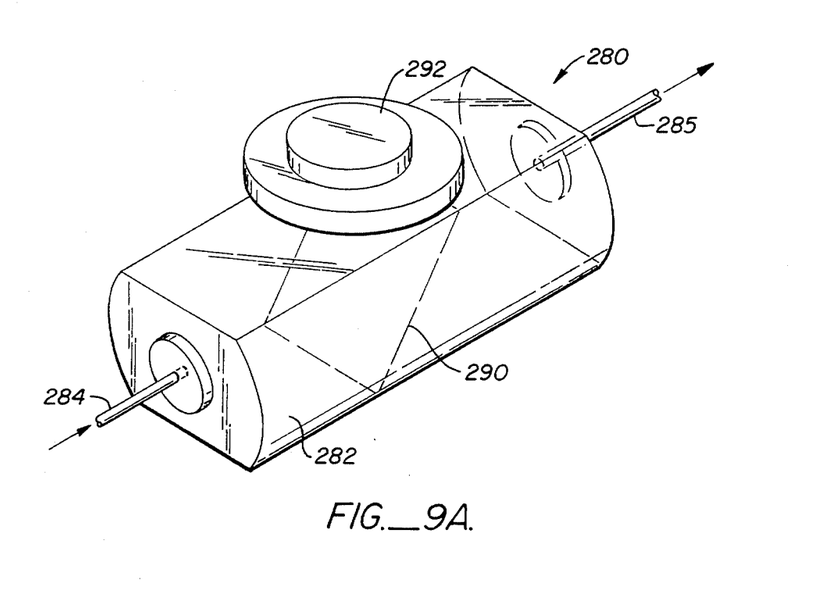
FIGS. 9A and 9B show a directional monitor.
Figure 9B:
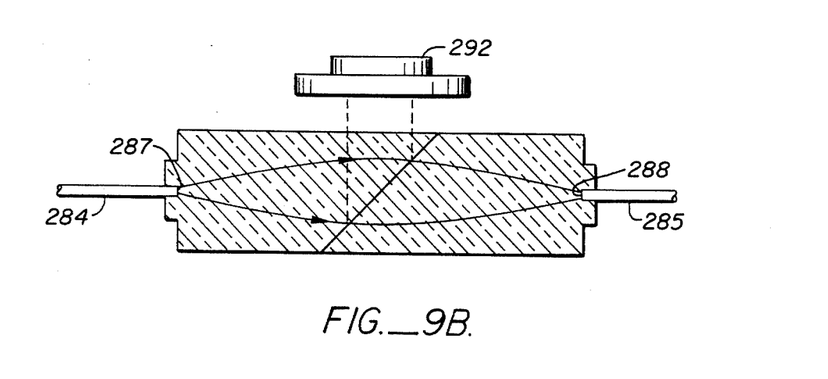

The couples described above have the property that they are bidirectional, that is, that the direction of light travel can be reversed and the device will still function in the same way. However, it sometimes happens that directionality is required in the monitoring or splitting operation. FIGS. 9A and 9B illustrate a coupler 280 having a directional monitoring feature. In particular, a directional coupler 280 comprises a body of graded index (self focusing) material 282 for coupling first and second fibers 284 and 285. Graded index material has the property that a point source at a first axial location is imaged at a second axial location. Thus, in order to couple fibers 284 and 285, respective fiber ends are located at complementary axial positions 287 and 288. A beam splitter surface 290 is interposed at an oblique angle in the path of the light and reflects a small fraction to a suitable detector 292. Due to the oblique inclination, detector 292 only receives light when the light is traveling from fiber 284 to fiber 285.

In summary it can be seen that the present invention provides a surprisingly effective series of modules for interfacing optical fibers with a very low light loss and with provisions for monitoring the optical signal. While the above provides a full and complete disclosure of the preferred embodiment of the present invention, various modifications, alternate constructions, and equivalents may be employed without departing from the true spirit and scope of the invention. For example, the splitters and switches described were geometrically symmetric devices. However, there is no need for such geometrical symmetry, nor is there any absolute requirement that the fractions of light transmitted be equal or that the switching be total. Rather, a switch could employ features of a splitter as well in order to provide partial switching and partial splitting. Moreover, while a common focal plane is shown, this is not an absolute prerequisite. Therefore, the above descriptions and illustrations should not be construed as limiting the scope of the invention which is defined by the appended claims.

We claim:

1. A device for coupling the output from a source of light to an end of an optical fiber comprising:
    a body of optically transparent material having an index of refraction substantially equal to the index of refraction of said fiber, said body having a portion defining a spherical reflective surface characterized by a focal plane having the property that a point source of light in said focal plane is imaged in said focal plane, said reflective surface being characterized by a coefficient of reflection sufficiently less than unity to permit a detectable fraction of light incident on said reflective surface to pass therethrough;
    first position defining means for registering said source of light to a first location within said focal plane;
    second position defining means for registering an end of said fiber to a second location within said focal plane and separated from said first location, said first and second locations being on opposite sides of a radial axis, being displaced equal amounts from said radial axis such that the center of curvature of said spherical reflective surface lies on the straight line between said first and second locations, whereby said second location is optically complementary to said first location so that said light source, when positioned at said first location, is imaged on said end of said fiber at said second location; and
    a photodetector on the side of said reflective surface remote from said focal plane for providing a signal representative of the intensity of said light source when said light source is positioned at said first location.

2. The invention of claim 1 wherein said light source is an end of a second optical fiber, and wherein said first position defining means is sized to maintain said end of said fiber at said first location so that light emanating from said second fiber is imaged on the end of said first fiber and thus transmitted thereinto, such that said device functions as a fiber/fiber coupler.

3. The invention of claim 2 wherein each of said first and second position defining means includes respective fiber alignment means to maintain said fibers oriented so that their axes, when extended toward said reflective surface, intersect one another at a point on said reflective surface so that an axial ray from said second fiber enters said first fiber along the axis of said first fiber.

4. The invention of claim 1 wherein said first source comprises a light emitting diode, and wherein said first position defining means is sized to maintain said light emitting diode at said first location, such that said device functions as a source/fiber coupler.

5. The invention of claim 1 wherein said second position defining means comprises a transparent member optically continuous with said transparent body, said member being located on the side of said focal plane remote from said reflective surface adjacent said second location and being provided with a cylindrical bore having a bottom at said second location, said bore being characterized by a diameter equal to the diameter of said fiber to permit said fiber to be glued thereinto with an index matching cement to provide optical continuity between said fiber and said body.

6. The invention of claim 1 wherein said body comprises first and second portions having a spherical interface at a position intermediate said plane and said reflective surface, said interface defining said pivot means.

7. The invention of claim 1 wherein said first source comprises a laser, and wherein said first position defining means is sized to maintain said laser at said first location, such that said device functions as a source/fiber coupler.

8. A switch for selectively communicating optical information between an input optical fiber and one of a plurality of N output optical fibers comprising:
    a body of optically transparent material having an index of refraction substantially equal to the index of refraction of at least one of said input and output fibers, said body having a portion defining a spherical reflective surface;
    input fiber positioning means for registering an end of said input fiber to define an axis;
    output fiber positioning means for registering respective ends of said output fibers to respective locations within a plane perpendicular to said axis;
    pivot means for allowing sufficient rotation of said reflective surface about a point on said axis and removed from the center of curvature of said spherical reflective surface to provide a plurality of N positions wherein the end of said input fiber is imaged at the end of a corresponding one of said output fibers for each position; and indexing means for maintaining said reflective surface in a selected one of said plurality of positions.

9. The invention of claim 8 wherein said body is formed of a flexible material and includes a necked portion between said reflective surface and said plane such that such pivoting occurs about said necked portion to define said pivoting means.

10. The invention of claim 8 wherein said indexing means comprises:
  an open frame rigidly coupled to said input fiber positioning means and having portions defining a corresponding plurality of inwardly opening tapered depressions
  a member rigidly coupled to said reflective surface and having a corresponding plurality of outwardly protruding tapered wedge elements adapted to mate with said depressions on said frame such that when one of said wedges is seated in its corresponding depression, said reflective surface is in said corresponding position.

11. The invention of claim 10 wherein said member is coupled to said reflective surface by a lever arm to increase the translational motion of said wedge elements for a corresponding angular motion of said reflective surface, whereupon said positions of said reflective surface may be achieved to a precise angular tolerance with relatively loose tolerances on said indexing means.

12. A device for permitting optical signals at first and second wavelengths to be transmitted simultaneously on a single optical fiber comprising:
  means for registering an end of said fiber to a fixed location;
  a dichroic beam splitter for directing light of said first wavelength emanating from said fiber end along a first optical path and light of said second wavelength emanating from said fiber end along a second optical path, at least a portion of which is separated from said first optical path;
  a first body of optically transparent material having a portion defining a spherical reflective surface in said first optical path wherein light of said first wavelength emanating from said fiber end is imaged at a first image location; and
  a second body of optically transparent material having a portion defining a spherical reflective surface in said second optical path wherein light of said second wavelength emanating from said fiber end is imaged at a second image location separate from said first image location.

13. The invention of claim 12, and further comprising:
  second means for registering a source of light of said first wavelength at said first image location; and
  third means for registering a detector sensitive to light of said second wavelength at said second image location, whereby said device functions as a duplexer.

14. The invention of claim 12, and further comprising second and third means for registering respective sources of light of said first and second wavelengths at said first and second image locations whereby said device functions as a multiplexer.

15. The invention of claim 12, and further comprising second and third means for registering respective detectors sensitive to light of said first and second wavelengths at said first and second image locations whereby said device functions as a demultiplexer.

16. The invention of claim 12 wherein said first and second image locations and said fiber end are substantially coplanar.

17. A splitter for communicating optical information between an input optical fiber and a plurality of N output optical fibers comprising:
  a body of optically transparent material having an index of refraction substantially equal to the index of refraction of at least one of said input and output fibers, said body having portions defining a plurality of spherical reflective surface segments, each of said reflective surface segments intercepting a 360°/N segment of a cone of light emanating from an end of said input optical fiber and imaging said end of said input fiber at one of a corresponding plurality of N image locations; and
  a corresponding plurality of fiber positioning means for registering an end of a respective output fiber at a corresponding image location so that the light emanating from said input fiber and lying within the respective 360°/N segment is imaged on said output fiber.

18. The invention of claim 17 wherein said image locations lie in a common plane perpendicular to the axis of said input fiber.

19. The invention of claim 17 wherein each of said spherical reflective surface segments is pie-shaped, all of said spherical reflective surface segments being in abutting relationship about a common center located along the axis of said input fiber.

20. The invention of claim 17 wherein said body comprises portions defining a corresponding plurality of plane reflective surface segments, each intersecting said 360°/N portion and reflecting said portion to a corresponding one of said spherical reflective surface segments.

* * * * *